United States Patent [19]

Syassen

[11] 3,832,935
[45] Sept. 3, 1974

[54] PISTON CYLINDER ENGINE WITH PRESSURIZED PISTON ROD SEAL

[75] Inventor: Onno Syassen, Augsburg, Germany

[73] Assignee: M.A.N. Maschinenfabrik Augsburg-Nurnberg Aktiengesellschaft, Augsburg, Germany

[22] Filed: Apr. 19, 1973

[21] Appl. No.: 352,711

[30] Foreign Application Priority Data
Apr. 26, 1972 Germany.................... 2220404

[52] U.S. Cl.................. 92/156, 92/86, 92/86.5, 92/168
[51] Int. Cl. .................. F01b 31/10, F16j 15/18
[58] Field of Search........ 92/168, 86.5, 86, 82, 153, 92/156; 60/24

[56] References Cited
UNITED STATES PATENTS

| | | | |
|---|---|---|---|
| 3,019,739 | 2/1962 | Prosser | 92/168 |
| 3,132,568 | 5/1964 | Strader | 92/168 |
| 3,310,230 | 3/1967 | Wirth | 92/168 |
| 3,568,436 | 3/1971 | Heffner et al. | 60/24 |

Primary Examiner—Paul E. Maslousky
Attorney, Agent, or Firm—Flynn & Frishauf

[57] ABSTRACT

To seal the piston rod through an end wall of the cylinder, the piston rod is formed with a bore in which a sealing packing is located. In the wall, between the bore and outside surface of the wall, a pressure chamber is formed surrounding the piston rod into which a pressure fluid is introduced, to press the packing material against the piston rod, provide lubrication for sliding movement between the piston rod and the packing, and effect a gas-tight seal during such sliding movement. Any pressurized fluid which may leak into the cylinder is carried off by the cylinder by a drain which is periodically isolated from the interior of the piston by a valve, to permit accumulated leakage fluid to be drained off. For a vertical piston, the drain may be located at the lowest point of a slightly inclined bottom wall surface, or to drain from a groove formed at the outside circumference of the bottom wall. The drain is preferably blocked by a sump at the time the piston reaches the lowest dead center position, to permit drainage of the sump.

14 Claims, 1 Drawing Figure

PATENTED SEP 3 1974  3,832,935
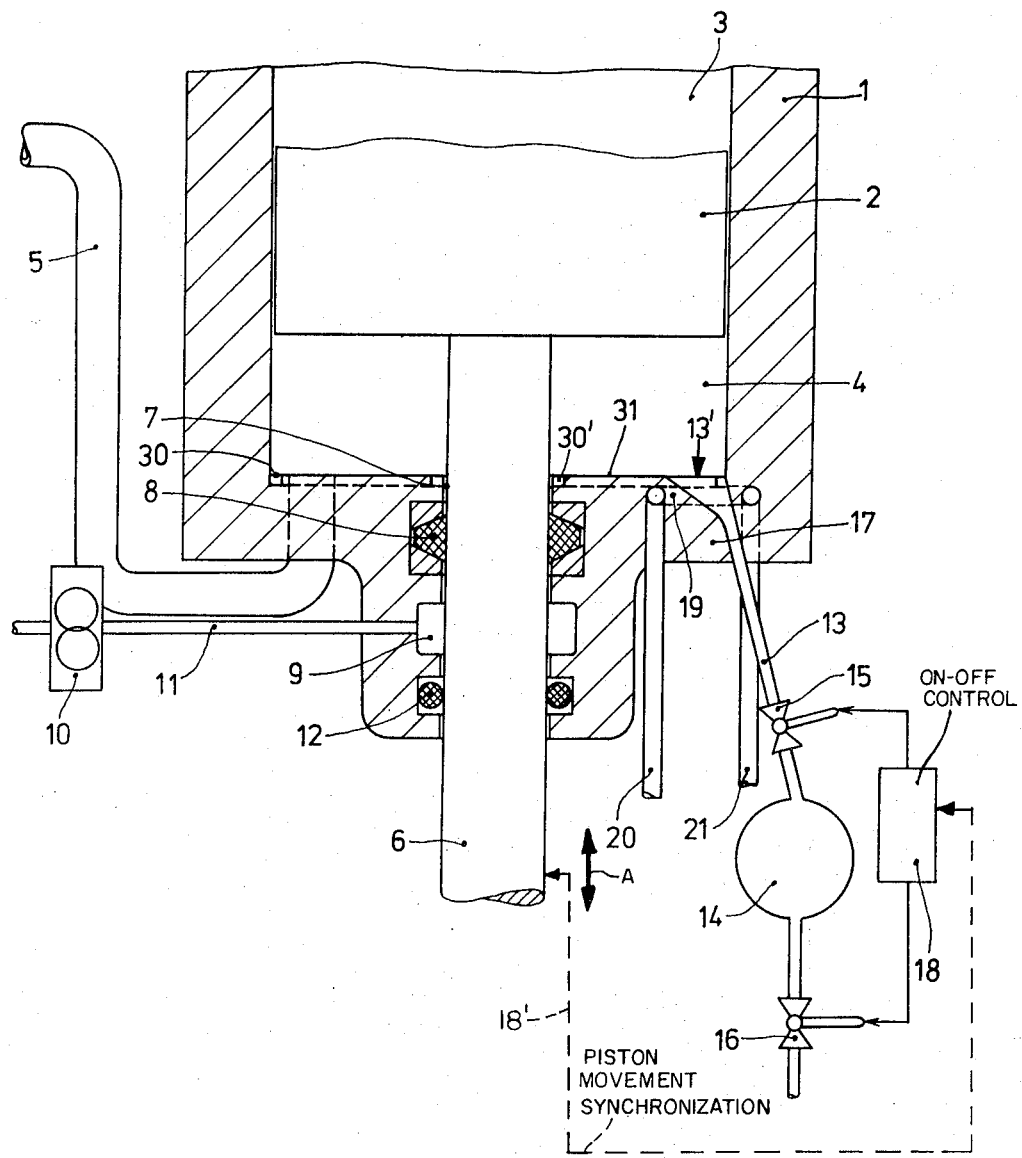

3,832,935

PISTON CYLINDER ENGINE WITH PRESSURIZED PISTON ROD SEAL

Cross reference to related Patents: U.S. Pat. Nos. 3,795,102; 3,795,112; 3,802,198.

The present invention relates to a piston-cylinder engine and more particularly to a seal to seal the piston rod through an end wall of the cylinder.

Piston-cylinder engines, particularly hot gas, external combustion engines which have a reciprocating piston rod require a seal which seals the piston rod in gas-tight relationship from ambient atmosphere, in order to prevent escape of gases from the inside of the cylinder, beneath the piston and the cylinder end wall.

In hot gas machines it is important that the working gaseous fluid is available in uniform quantity, and free from contamination, in order to provide mechanical output to the engine. It is particularly important that contamination with substances which might interfere with heat transfer, and heat conduction of the working fluid be prevented.

Hot gas machines of the type to which the invention relates are known (see, for example, German Pat. No. 1,198,626). The cold working space of the engine must be sealed from the interior of the engine, and in the aforementioned construction a bellows or membrane arrangement has been proposed in order to seal the reciprocating piston rod to the surrounding housing portion of the cylinder while permitting movement of the piston rod. The end of the bellows, or corrugated membrane which is connected to the piston rod moves with the piston rod to and fro. The central portion of the membrane, or the bellows, respectively, is constantly deformed and bent backwardly and forwardly, which results in metal fatigue of the material of the membrane and thus leads to frequent breakages of the membrane itself. This seal thus requires frequent replacement, and constant checking for leaks, and thus interferes with efficient operation of the engine while, further, requiring careful attention and high maintenance.

It is an object of the present invention to provide a cylinder-piston engine, more particularly a hot gas engine, in which problems connected with sealing of the piston rod from ambient atmosphere are so reduced as to be practically negligible, and to substantially increase the operating time and reliability of the seals for the piston rod.

SUBJECT MATTER OF THE PRESENT INVENTION

Briefly, the engine is so constructed that the cylinder wall through which the piston passes is formed with a pressure chamber, which is located between the outer surface of the end wall of the cylinder and an inner fixed packing seal. The pressure chamber, surrounding the bore through which the piston rod passes, has a pressure fluid applied thereto. The working space within the cylinder has a drainage duct connected thereto from which any leaking fluid can be removed.

Working fluid is applied at one side of the packing. This working fluid may be under pressure. The other side of the packing has pressure fluid applied thereto. The pressure of the pressure fluid effectively prevents leakage of the working fluid, typically gases towards the outside, and passage of the working gases throuh the packing. The presence of the pressure fluid has lubricating and cooling effects on the packing around the piston rod, so that the packing is subject to little wear and ensures reliable sealing with no escape of gases, or other fluid from the inside of the cylinder, while maintaining the necessary design clearances, which may be extremely small. The drainage or sump line, connected to the working space of the cylinder is so arranged that any pressure fluid which might penetrate into the cold space of the cylinder can be removed therefrom. The machine, therefore, is free from contamination by substances which might interfere with heat transfer from the gaseous medium. Any leakage pressure fluid which might penetrate into the working space is promptly removed therefrom, before it can vaporize or mix with the working fluid, or to be carried away thereby to precipitate in a condenser or the like, thus eventually fouling the condenser.

In a preferred form of the invention, the connection of the liquid drain line in the interior of the cylinder has an initial funnel-shaped enlargement, which permits connection of leakage pressure fluid in the enlarged portion of the drain line, to be later drawn off into a sump container which, in turn, can be isolated from the outside atmosphere. The funnel-like initial portion further contributes to effective collection of any leakage fluid.

The invention will be described by way of example with reference to the accompanying drawing, wherein the single drawing is a partly schematic, partly longitudinal sectional view through a cylinder-piston engine illustrating the seal in cross-sectional, schematic representation.

A cylinder 1 of a hot gas engine has a piston 2 reciprocably mounted therein. Piston 2 separates a hot working space 3, above the piston, from cold working space 4 below he piston. The working spaces are connected externally by ducts, of which only connection duct 5 is shown, which include a cooler or condenser, a regenerator, and a heater. The temperature of the working fluid or gas, which may, for example, be helium, in the hot working space 3 may be about 700° C. The temperature of the working fluid in the cold space may be, for example, between 50° to 70° C.

Piston 2 is connected to piston rod 6 which is passed through a bore 7 passing through the bottom wall 17 of the cylinder. A sealing packing 8 is located in the wall region of the bore 7, close to the cold working space 4. This packing may be formed, for example, of a series of sequentially located rings, or the like. These sealing rings which may be, for example, of plastic material are pressed by the pressure of the working fluid within the cold space 4 against piston rod 6. The packing rings may likewise be biased by a spring, or other resilient pressure arrangement against piston rod 6. The packing seal effectively seals the cold working space 4 from ambient atmosphere.

At the side of the packing remote from the interior of space 4, that is, at the side of the packing towards the outside surface of the bottom wall 17 of the cylinder, a pressure chamber 9 is worked into the bottom wall from the bore 7. Pressure chamber 9 preferably is formed as a ring groove cut into the wall of the bore 7. A pressure line 11, supplied from a pump 10, connects pressure fluid to pressure chamber 9. A suitable pressure fluid is water. Water is cheap and entirely suitable to obtain the results and advantages forming an object of the present invention. Water is no subject to explosion or ignition in case leakage fluid should come in contact with a hot part of the machine. Other liquids, such as silicone oil, polyphenyl ether, for example, may be used as pressure fluids. The pressure fluid should preferably have the characteristic of a clearly defined boiling point, or a very narrow temperature range of boiling, and should be compatible with the working gas used in the engine, that is, neither the working fluid nor the gas should be affected by mutual contact that is, the gas and the working fluid are mutually inert. The packing seal 8 prevents penetration of water from the pressure chamber 9 into the cold working space 4. An additonal seal such as, for example, an O-ring 12 is provided at the lowest portion of the bottom wall 17 in order to prevent escape of water into the atmosphere from pressure chamber 9. Seal 12 thus prevents excessive loss of pressure fluid, that is, leakage of water under pressure. The seal 9 has the additional function of pre-cleaning the piston rod, by sliding contact with the piston rod and stripping any contaminating portions at that point, in order to prevent introduction of contamination in the direction of the cold working space 4. The sealing ring 12, itself, may be formed of a plurality of serially arranged rings, only one of which is shown for simplicity, to form a composite sealing assembly.

Some water will leak past seal 12. This water can readily be trapped, and re-cycled for re-use. Some water will, additionally, leak into the cold working space 4. To drain leakage water which has reached the cold working space 4, a fluid collection and drain line 13 is provided. The inner surface of the bottom wall 17 of the cylinder is formed with a circumferential ring groove 30 which terminates in a funnel-shaped enlargement 13′, connected with the drain line 13. Drain line 13 is connected to a sump vessel 14, which can be separated from the cold space 4 by a valve 15 and isolated from ambient air by a valve 16.

The funnel-shaped enlargement 13′, with which the line 13 terminates in the interior of the cold space 4 is preferably located at a low point of the cold space. The inner surface of the bottom wall 17 is preferably slightly inclined in the direction of the funnel 13′, in order to decrease the time which is required for any leakage fluid to drain into funnel 13′. The inclination can be very small, a few degrees at the most. In order to permit complete removal of leakage fluid from the cold working space 4 upon the downward stroke of the piston 2, the surface of the piston facing the bottom wall 17 can be likewise slightly inclined, to fit the inclination of the bottom wall 17. Since the extent of inclination is small, the piston will not be substantially unsymmetrically loaded.

Valve 15, when opened, permits drainage of fluid collected in the funnel 13′ and in the line 13 into the sump vessel 14. Valve 15 can then be closed, and valve 16 opened, in order to drain sump vessel 14 to a suitable catch, or sump, for re-use, and re-cycling. Any fluid within the line 13 can thus be drained without effecting a direct connection for the cold working fluid directly with ambient atmosphere. The valves 15, 16 are preferably controlled electronically by a control circuit 18, synchronized with the operation of the engine as indicated schematically by arrow A, and dashed line 18′. This permits draining of the leakage fluid collection line 13 effectively without loss of working gas or working medium from the cold space 4, if the control is so set that valve 15 opens briefly when the piston 2 has reached the lower dead center position. Condensation of leakage fluid which may be present in the form of vapors in the cold working space 4 is facilitated and accelerated, by cooling the wall of the cylinder 1 in the region of the termination of the leakage collection line 13. If water is used, change of water into vapor, or steam, is thus effectively prevented. The cooling arrangement is in form of a cooling coil 19, surrounding the duct or collection line 13, and connected to cooling fluid supply and drain lines 20, 21. Other cooling arrangements may be used, for example cooling ducts located concentrically to the piston rod 6, cut or cast into bottom wall 17, or located in the cylinder walls 1, particularly in the regions close to the junction of walls 1 and 17. The cooling effect of the cooling system can be increased to such an extent that contamination of the working medium with water vapor will be so small as to be neglectable. Vehicular motors of this type, which are subject to high degree of vibration and which may be located at other than vertical positions, that is, which may be operated in various conditions of inclination are preferably always formed with the ring groove 30. An additional ring groove 30′ can be arranged surrounding piston rod 6, and communicating with the funnel-shaped enlargement 13′ by a radially arranged drain duct. An additional seal can be located above the groove 30′ to seal off the groove 30′ from the interior of the cold working space 4.

Refrigeration machines operating in accordance with a Sterling system and which heretofore have been constructed with dry seals for the reciprocating pistons, may likewise be sealed in the manner described, since they operate, essentially, similarly to hot gas engines.

The cooling effect of the cooling coil 19 should be so designed that any leakage fluid which penetrates into the cold working space 4 is held in a temperature range in which the vapor pressure is so low that the proportion of vapor with respect to the leaking pressure fluid is so low as to be neglectable. The cooling system thus reliably ensures that contamination of the working medium with vapor of the liquid used as a pressure fluid will not exceed design limits.

Various changes and modifications may be made within the scope of the inventive concept.

I claim:

1. Piston-cylinder engine having
    a cylinder (1), a piston (2) having a piston rod (6) secured thereto and mounted for reciprocation in the cylinder, the cylinder having a closed end wall (17) facing the piston at the side where the rod is connected thereto, the wall (17) being formed with a bore (7) through which the rod (6) passes;
    and means sealing the piston rod (6) in the bore (7) to separate the interior of the cylinder from ambient air outside of the cylinder end wall, in gas-tight relation, comprising
    a sealing packing (8) located in the wall (17) and surrounding the piston rod (6);
    a pressure chamber (9) formed in the end wall (17) surrounding the piston rod (6) and located between the sealing packing and the outside surface of the wall (17);
    means (10, 11) introducing a pressure fluid into the chamber to bias the packing (8) against the rod, lubricate the rod in the packing, and provide a fluid seal;

and closable fluid drain means (13) connecting the inside surface of the wall (17) with the outside of the cylinder to drain any leakage fluid escaping from the pressure chamber (9) through the sealing packing (8) into the interior of the cylinder.

2. Engine according to claim 1, wherein the fluid communication means (13) terminates at the inner surface of the end wall (17) with an enlargement (13') in form of a collecting funnel.

3. Engine according to claim 1, wherein the closable fluid connection means (13) terminates at the inside surface of the end wall, and the inside surface is inclined slightly towards said termination to provide for drainage of leakage fluid towards said connection means (13).

4. Engine according to claim 3, wherein the bottom surface of the piston is slightly inclined towards said termination means matching the inclination of the end wall.

5. Engine according to claim 1, further comprising a fluid vessel (14) in the drain fluid connection means (13); and valve means (15, 16) selectively connecting the fluid vessel (14) through the connection means with the interior of the cylinder or to an outside drain, respectively.

6. Engine according to claim 5, further comprising control means (18) selectively alternately opening and closing said valve means (15, 16) in synchronism with operation of the piston in the cylinder to open communication between the vessel and the cylinder at the time the piston is at bottom dead center position, and to open connection of the vessel to the drain at other times.

7. Engine according to claim 1, further comprising cooling means (19) located in the cylinder in the region of termination of the fluid communication means in the cylinder.

8. Engine according to claim 1, further comprising an additional sealing ring (12) located between the pressure chamber (9) and the outside surface of the end wall.

9. Engine according to claim 1, wherein the cylinder is formed at the bottom with a leakage collection groove (30, 30'), said groove communicating with the fluid connection means (13);

and cooling means are located in the cylinder surrounding the collection groove.

10. Engine according to claim 1, wherein the cylinder is formed at the bottom with a leakage fluid collection groove (30') surrounding the bore (7), said groove communicating with the fluid collection means (13).

11. Engine according to claim 1, wherein hot gas is dispose in the cylinder space above the piston, and cold gas is located in the cylinder space beneath the piston; wherein said gas is helium.

12. Engine according to claim 1, wherein the pressure fluid is water.

13. Engine according to claim 12, wherein the sealing packing (8) comprises plastic packing rings.

14. Engine according to claim 1, wherein a working gas is disposed in the cylinder space beneath the piston and wherein the pressure fluid is a liquid having a boiling point within a narrow range and comprises a substance which is inert with respect to the working gas.

* * * * *